United States Patent [19]

Haselier

[11] 4,307,133

[45] Dec. 22, 1981

[54] METHOD FOR THE APPLICATION OF A POLYMER COATING TO A METAL SURFACE AND POLYMER POWDER SUITABLE FOR THE METHOD

[75] Inventor: Frans J. J. Haselier, Schinnen, Netherlands

[73] Assignee: Stamicarbon, B.V., Geleen, Netherlands

[21] Appl. No.: 157,839

[22] Filed: Jun. 9, 1980

[30] Foreign Application Priority Data

Jun. 29, 1979 [NL] Netherlands ......................... 7905060

[51] Int. Cl.³ ............................................. B05D 1/12
[52] U.S. Cl. ............................. 427/195; 260/45.85 B; 260/45.85 S; 427/201; 428/462
[58] Field of Search ................ 260/45.85 B, 45.95 B, 260/45.85 S, 525; 428/462; 427/195, 201

[56] References Cited

U.S. PATENT DOCUMENTS

| | | | |
|---|---|---|---|
| 2,663,652 | 12/1953 | Railing | 427/201 |
| 3,410,709 | 11/1968 | Meyer et al. | 427/195 X |
| 3,639,189 | 2/1972 | Hartman | 428/462 |
| 4,007,298 | 2/1977 | Feehan et al. | 427/195 X |

*Primary Examiner*—Shrive P. Beck
*Attorney, Agent, or Firm*—Cushman, Darby & Cushman

[57] ABSTRACT

Compositions of polyolefins having from 0.5 to 80% by weight of unstabilized polyethylene powder and from 20% to 99.5% by weight of a stabilized polyolefin powder. These powdered compositions have superior adhesion to metallic objects and can be applied directly to heated metallic objects to provide the protective coating.

7 Claims, No Drawings

METHOD FOR THE APPLICATION OF A POLYMER COATING TO A METAL SURFACE AND POLYMER POWDER SUITABLE FOR THE METHOD

This invention relates to a method for the application of a polymer coating to a metal surface, in which method at least one polyolefin in powder form is applied to a heated metal surface.

In general, such a method is presently common knowledge and is particularly used for the application of a polymer coating to metal tubes in order to prevent corrosion thereof. This technique is used, for instance, for pipelines for the transport of gas and oil which are laid in the earth; other metal objects as well are provided in this way with a polymer coating.

In utilizing such a method, two problems present themselves. The first problem concerns the adhesion of the polymer coating to a metal, particularly with polyolefin coatings. In literature it has already been suggested to use various kinds of adhesion improvers, such as ethylene-vinylacetate copolymers, and the like. The application of such adhesion improvers is generally effected in the form of an extra or initial coating applied prior to the polymer, specifically polyethylene, coating. However, this technique means an extra processing step, which is undesirable because of the resulting cost increase.

A possible solution to overcome this problem would be to utilize unstabilized low-density polyethylene polymers. Owing to the specific properties of this type of polyethylene, such as short side chains, such a polyethylene will oxidize under the influence of the heat present in the pre-heated metal object, specifically the tube or pipe, for instance, and thereby adhere better to the metal surface. However, a polyethylene coating thus applied to a metal object lacks sufficient stability to cope with weather influences for a sufficiently large number of years.

This actually raises the second problem, viz., the requirement that the polyethylene coating must be resistant to weather influences for a sufficiently long period of time. For this end, the polymer must contain a stabilizer. If, however, the starting material is a polymer powder sufficiently stabilized to produce a polymer coating resistant to weather influences for a few decades, the polymer coating will then have an insufficient adherence to the metal surface.

So the proposed solution of one problem actually creates the other problem.

The purpose of the present invention is to provide an improvement to the method as described above, in which each of these two problems is overcome.

The present invention particularly resides in the discovery of the advantageous use of a powder mixture consisting essentially of from 0.5 to 80% by weight of unstabilized polyethylene powder and from 20 to 99.5% by weight of a powder of a stabilized polyolefin.

In this connection, "stabilization" is to be understood as meaning the stabilization of the polymer against oxidation and thermal decomposition, while small quantities of "stabilizer" (in the order of a few tens of parts per million), which enter the products as impurities via the auxiliary materials, pumps and compressors in, for instance, the high pressure polymerization of ethylene, are omitted from consideration.

Polyethylene is preferably employed as the polyolefin, while more specifically, for the whole mixture, the starting material is advantageously polyethylene of a density of between 905 and 940 kg/m$^3$. Such a polyethylene may usefully contain, per 1000 carbon atoms, from 10 to 50 terminal methyl groups.

Surprisingly, it has now been found that, if such a powder, i.e., a mixture of a stabilized polymer powder and of a unstabilized polyethylene powder is employed in the foregoing coating method, the problems described above do not appear. That is, both the adhesion of the polymer coating to the metal objects is very good and the resistance against weather influences is maintained for a very long time. It is very surprising for these combined phenomena to occur. Since a part of the polymer powder remains present in unstabilized form, the expert would expect this unstabilized component to at least partially reduce the resistance against weather influences. At the same time, the stabilization of a portion of the polymer in the mixture might be expected to seriously damage the adhesion properties. However, experiments have now shown that these expectations are by no means true.

In a preferred mode of practicing the present invention, from 1 to 30% more in particular 5 to 25% by weight of unstabilized polyethylene powder is employed in the total mixture. It has now appeared that the optimum characteristics in respect of both adhesion and stability are achieved between these limits. Especially at amounts of unstabilized powder, higher than about 30% by weight, the too rapidly changing meltflow characteristics of the coating prevent the formation of a smooth surface of the polymer coating.

Preferably, the total quantity of stabilizer in the stabilized powder is from 0.01 to 5.0% by weight, more particularly from 0.05 to 2.0% by weight. As already indicated above, the unstabilized powder may also contain small, inactive quantities of stabilizer which, on account of the preparative method, will inevitably enter the end product. These quantities, however, are far below 100 parts per million.

Suitable stabilizers for use in the method according to this invention are, for instance, phenolic antioxidants (optionally sterically hindered), phosphorous-containing compounds such as, phosphonites, phosphonates and phosphites, sulfur-containing antioxidants and amines or mixtures thereof. These stabilizers can be used in conjunction with UV-stabilizers such as hydroxybenzophenones, hydroxybenzotriazoles, Ni-chelates and/or piperidine-compounds.

Examples of suitable stabilizers are -2,6-ditert.-butyl-4-methylphenol, octadecyl 3-(3,5-ditert.butyl-4-hydroxyphenyl)propionate.

1,1-bis(5-tert.butyl-4-hydroxy-2-methylphenyl)butane.

1,1,3-tris-(5 tert.butyl-4-hydroxy-2-methylphenyl)butane.

penta erithrytyl tetrakis [3-(3,5 ditert.butyl-4-hydroxy phenyl)propionate].

2,2'methylene-bis-(6-tert.butyl-4-methylphenol).

2,2'methylene-bis-[4-methyl-6-(1-methylcyclohexyl)-phenol].

dilauryl-, distearyl-, dimyristyl-, and/or ditridecyl-thiodipropionate.

di-stearyldisulfide.

4,4'-thiobis(2 tert.butyl-5-methylphenol).

pentaerithrytol-tetrakis-(3-laurylthiodipropionate).

2,2 thioethanolbis-3-(3,5 ditert.butyl-4-hydroxyphenyl)propionate.

polymerized 2,2,4-trimethyl-1,2-dihydrochinoline.

N,N-di-(2-naphtyl)p.phenylenediamine.

N,N'-diphenyl-p.phenylenediamine.

trisnonylphenylphosphite.

diphenyl iso octylphosphite.

tris-(2,4 ditert.butylphenyl)phosphite.

distearyl penta erithrytol diphosphite.

tetrakis-(2,4 ditert.butylphenyl)-4,4'-biphenylenediphosphonite.

Ni- or Ca-salt of bis[O-ethyl-(3,5 ditert.butyl-4-hydroxybenzyl)]phosphonate.

Optionally, the powder may also contain a quantity of carbon black, as well as other additives.

The technique used for the application of the powder and the nature of the metal surface to be coated will determine the choice of the average particle size for the powder. This will often be between about 0.1 to 0.5 mm.

For the preparation of the polymer powder, the customary techniques can be used. Preference is given to grinding of granulated polymer, in customary grinders, to the desired particle size.

The temperature of the metal surface must be such that, when applying the powder sufficient adhesion occurs due to the oxidation of the polymer. This means that the temperature will usually lie between the melting point of the powder used and the temperature at which the polymer used will ignite spontaneously. For ldpe a suitable temperature range is from 100° C. to 350° C.

The heating of the metal surface occurs mostly before the powder is applied to it, in order to prevent uneven adhesion and porosity of the polymer coating. As is already known, the heat-content of the metal (mass, specific heat and temperature) determines in that case the maximum possible thickness of the polymer layer.

The heating may be achieved in ovens by means of hot air or direct flames. In special cases, various forms of radiation may be applied. With tubes, for instance, it may be advantageous to heat the full length of the tube by means of gas flames inside or outside the tube, while the tube slowly rotates round its axis.

This invention is generally applicable to virtually all powder-coating techniques. Examples thereof are flame spraying, whirl sintering, rotational moulding, powder sprinkling and electrostatic coating.

The invention is also directed to the polymer powder as hereinbefore described and suitable for the present process, as well as to metal objects, more in particular pipes, which are coated with a polymer using said process.

The invention will now be elucidated by means of the following specific examples but is not restricted to them.

EXAMPLES I TO XI

A steel tube with a diameter of 170 mm was heated to 613° K., upon which a layer of polyethylene powder of low density (191 kg/m$^3$) was sprinkled over the full length of the tube, while the tube was slowly rotating around its axis. The following table successively shows the percent by weight of unstabilized polyethylene in relation to the powder mixture, the kind of stabilizer in the stabilized polyethylene, the percentage of stabilizer in the stabilized polyethylene, the thickness of the coating, the adhesion (determined according to NEN 6902), the long-term stability determined according to NEN 6902, (oven-test, 1000 hours) and the thermal stability expressed as induction time determined with the DSC (differential scanning colarometer).

If a product is satisfactory in an oventest this means that within the time mentioned, no appreciable deterioration of the coating occurred.

The DSC-stability is given while it is a suitable, easy and fast to determine value, which gives a provisional indication about the stability of the product. Products having a longer DSC-stability have usually a better performance in the oventest. The DSC-stability is used as a provisional testprocedure to make a first screening of the powders.

In the Table, the stabilizers employed are identified as follows:

Irganox 1010 is pentaerytrityltetrakis [3-(3,5 ditertbutyl-4-hydroxyfenyl)propionaat].

SFOS MBP-5P is 2,2'methylene-bis-(6-tert.butyl-4-methylfenol).

Nonox WSP is 2,2 methylene-bis-[4 methyl-6-(1-methylcyclohexyl)-fenol].

DSTDP is distearyl-thio dipropionaat.

Examples I, II, VI and IX are not according to the invention, "(N.I.)" and for comparative purposes.

TABLE

| Examples | % Unstabd. Polymer | Stabilizers | Wt. Addition of Stabilizers to Stabilized Portion | Coating Thickness | Adhesion N/2 cm$^2$ (NEN 6902) | DSC* Stability (at 503° K.) (in minutes) | Oven Test at 373° K. (NEN 6902) |
|---|---|---|---|---|---|---|---|
| I(N.I.) | 100% | None | — | 2 mm | 125 | 0 | Unsatisfactory |
| II(N.I.) | 0% | Irganox 1010 + SFOS MBP-5P | 0.1 | 2 mm | 60–70 | 17.5 | Satisfactory |
| III | 5% | Irganox 1010 + SFOS MBP-5P | 0.105 + 0.105 | 2 mm | 130–150 | 52 | " |
| IV | 10% | Irganox 1010 + SFOS MBP-5P | 0.11 + 0.11 | 2 mm | 100 | 56 | Satisfactory[1] |
| V | 20% | Irganox 1010 + SFOS MBP-5P | 0.12 + 0.12 | 2 mm | 90 | 55 | Satisfactory |
| VI(N.I.) | 0% | Nonox WSP | 0.2 | 2 mm | 50 | 14 | " |
| VII | 5% | " | 0.21 | 2 mm | 95 | 17 | " |

TABLE-continued

| Examples | % Unstabd. Polymer | Stabilizers | Wt. Addition of Stabilizers to Stabilized Portion | Coating Thickness | Adhesion N/2 cm$^2$) (NEN 6902) | DSC* Stability (at 503° K.) (in minutes) | Oven Test at 373° K. (NEN 6902) |
|---|---|---|---|---|---|---|---|
| VIII | 10% | " | 0.22 | 2 mm | 100 | 12 | Satisfactory[1] |
| IX(N.I.) | 0% | Irganox 1010 + SFOS MBP-5P | 0.1 + 0.05 | 2 mm | 70 | 11.5 | Satisfactory |
| X | 25% | Irganox 1010 + SFOS MBP-5P | 0.1 + 0.05 | 2 mm | 125 | 3 | " |
| XI | 25% | Irganox 1010 + DSTDP | 0.1 + 0.05 | 2 mm | 100–125 | 2 | " |

*DSC = differential scanning calorimeter.
[1]These samples were satisfactory even in a 3000 h oven test.
[2]Test NEN 6902 stipulates 5-cm-wide strips; it has, however, proved to be more practical, and equally accurate, to carry out the tests on 2-cm-wide strips.

What is claimed is:

1. In a method for the application of a polymer coating to a metal surface, wherein a powder of at least one polyolefin is applied to a heated metal surface to form such coating, the improvement consisting essentially in employing a polymer powder mixture consisting essentially of from 0.5 to 80% by weight of unstabilized polyethylene powder and 20 to 99.5% by weight of a stabilized polyolefin powder.

2. The method according to claim 1, wherein said polyolefin is polyethylene.

3. The method according to either claim 1 or 2, wherein said polyethylene has a density of between 905 and 940 kg/m$^3$.

4. The method according to claim 2, wherein the stabilized powder contains from 0.01 to 5.0% by weight of stabilizer.

5. The method according to claims 1, 2 or 4, wherein from 1 to 30% by weight of unstabilized polyethylene powder and from 70 to 99% by weight of stabilized polyolefin powder are used.

6. The method according to claims 1, 2, or 4, wherein the powder used has an average particle size (d$_{50}$) of between 0.1 and 0.5 mm.

7. A polymer powder consisting of from 0.5 to 80% by weight of unstabilized polyethylene powder and from 20 to 99.5% by weight of stabilized polyolefin powder.

* * * * *